Oct. 12, 1926.
O. STOTTS
1,602,866
ANIMAL WEANER AND PROTECTOR
Filed April 16, 1926
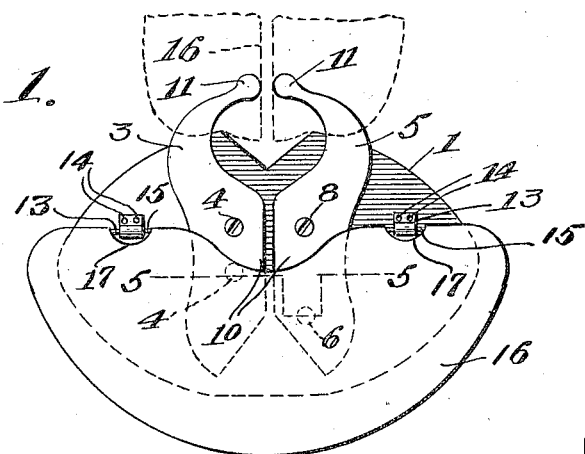
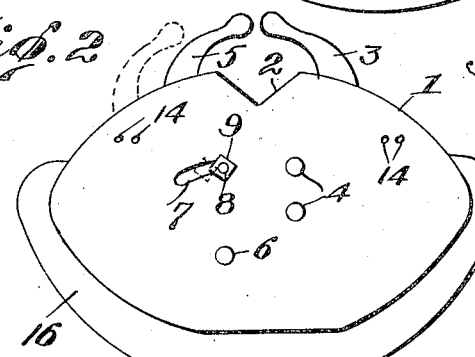
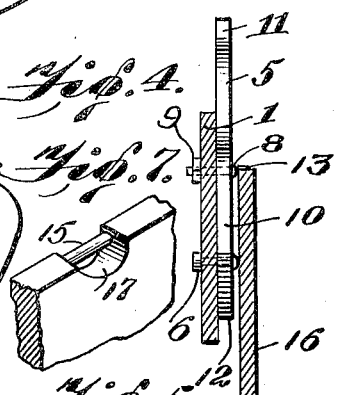
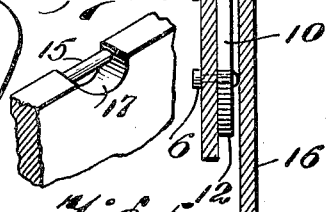
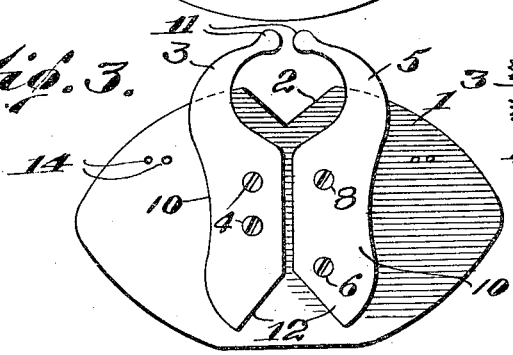
INVENTOR.
O. Stotts.
BY
ATTORNEYS.

Patented Oct. 12, 1926.

1,602,866

UNITED STATES PATENT OFFICE.

ORIEN STOTTS, OF LIBERAL, KANSAS, ASSIGNOR OF ONE-HALF TO JAMES A. JACKSON, OF LIBERAL, KANSAS.

ANIMAL WEANER AND PROTECTOR.

Application filed April 16, 1926. Serial No. 102,465.

This invention relates to an animal weaner and protector, and has for its principal object the production of a simple and efficient device, which may be easily attached to the nostrils of an animal for facilitating its weaning.

Another object of this invention is the production of a weaner which is provided with a plate, upon which is mounted a plurality of gripping jaws, and said plate is also provided with a V-shaped notch upon its upper edge so that the same may be more easily attached to an animal's nostrils.

Another object of this invention is the production of a device which may easily be attached to and detached from the nostrils of an animal, with the least possible effort.

A still further object of this invention is the production of a device which is provided with a primary plate. upon which is mounted attaching means, and an auxiliary plate.

The original of this application was filed May 28, 1917, Serial No. 171.455 and allowed November 13. 1917; this specification being a duplicate as allowed on said date.

With these and other objects in view this invention consists of certain novel combinations and arrangements of parts. as will be hereinafter more fully described and claimed.

In the drawings:—

Figure 1 is a front elevation of the device.

Figure 2 is a rear elevation of the device.

Figure 3 is a front elevation of the device showing the auxiliary plate removed.

Figure 4 is a section taken on line 4—4 of Figure 1.

Figure 5 is a section taken on line 5—5 of Figure 1.

Figure 6 is a fragmentary section taken through the device showing how the auxiliary plate is attached to the primary plate.

Figure 7 is a detail perspective view of the upper edge of the auxiliary plate, showing how the axle is attached thereto.

By referring to the drawings by numerals, it will be seen that 1 designates a substantially oval shaped primary plate, which is provided upon its upper edge with the V-shaped slot 2. Upon the front of this auxiliary plate 1 there is provided the fixed jaw 3, which is held in engagement with the plate 1, by means of the bolts 4. Alongside this fixed jaw 3 there is provided the pivot jaw 5, which is pivoted upon the rivet 6. There is also provided upon the plate 1 an arcuate slot 7, in which the bolt 8 is adapted to work, which bolt 8 is attached to the pivot jaw 5. Upon one end of this bolt 8 there is provided the nut 9, whereby the pivot jaw 5 may be adjusted as desired, by being pivoted upon the rivet 6, and held in a desired position by means of the bolt 8, and nut 9.

The jaws 3 and 5 are provided with the body portions 10, which extend upwardly and terminate in the ball gripping members 11. Upon the lower ends of the jaws 3 and 5 there are provided the cut-away portions 12, whereby the jaw 5 may pivot upon the bolt 6.

Upon the front elevation of the plate 1, there is provided the angle clamps 13, which are held in engagement at their right-angle feet-portions with the plate 1, by means of the rivets 14. These clamps 13 are provided with eye portions through which extend the axles 15. Mounted upon the axles 15 there is the auxiliary plate 16. This auxiliary plate 16 is provided with the semi-circular grooves 17, in which are mounted the axles 15.

When this device is in operation it will be seen that the ball gripping portions 11 are made to bear upon the membrane 18 of the nose of the animal, as shown in dotted lines in Figure 1. When the device is in this position it will be seen that it would be impossible for a calf or other such animals to use their mouth when their head is in an upward position, whereby the device will be an efficient weaner. When the animal, however, places his head in a lower position it will be seen that the auxiliary plate 16 will swing in a vertical plane, thus, causing the primary plate 1 to pivot upon the bearing balls 11, whereby the animal will be in a position to eat hay and the like. It will be seen that the device is simple of construction and may be easily assembled, and when assembled may be easily attached to and detached from engagement with the membrane 18 of the animal. It will also be seen that because of the V-shaped slot 2, the device may be placed in snug engagement with the nostrils of the animal, because of the fact that the membrane 18 will be allowed to extend within short distance of the slot 2.

What I claim is:—

1. A device of the class described, comprising a primary plate, jaws attached to said primary plate, an auxiliary plate, said auxiliary plate provided with a pair of semi-circular grooves formed in its upper edge, said plate provided with a horizontal axle extending across each of said grooves and positioned below the horizontal plane in which the contiguous upper edge of the auxiliary plate is formed, a pair of angle clamps engaging the primary plate, each clamp being bent to form an eye, each eye surrounding an axle of the auxiliary plate, each clamp provided with a foot-portion at an angle to the rest of the clamp, the foot-portion of each clamp resting flat against the primary plate, and fastening means extending through the feet-portions of said clamps and through the primary plate, securing the clamps to the primary plate and pivotally mounting the auxiliary plate upon the primary plate.

2. In an animal weaner and protector, the combination of a primary plate, a pair of angle clamps provided at their outer ends with eyes, means fixedly securing their inner ends to said primary plate, an auxiliary plate provided in its upper edge with grooves, said angle clamps having their eyes in said groove, axles extending through said eyes and across said grooves and secured at their ends to said auxiliary plate, and a fixed and an adjustably mounted jaw between said primary and auxiliary plates and mounted upon said primary plate.

3. In an animal weaner and protector, the combination of a primary plate, an auxiliary plate parallel with said primary plate, said auxiliary plate provided contiguous to its upper edge with horizontal axles, clamping means on said axles and fixedly secured to the primary plate constituting a hinge for said auxiliary plate, a pair of jaws between said plates, means fixedly securing one of the jaws to said primary plate, means pivotally mounting the other jaw upon said primary plate, said primary plate provided with an arcuate slot parallel with said last mentioned jaw, and fastening means extending through said last mentioned jaw and said arcuate slot limiting the pivotal movement of the jaw and capable of fastening the jaw in an adjusted position.

In testimony whereof I hereunto affix my signature.

ORIEN STOTTS.